US008812486B2

(12) United States Patent
Markl et al.

(10) Patent No.: US 8,812,486 B2
(45) Date of Patent: Aug. 19, 2014

(54) DETERMINING VALIDITY RANGES OF QUERY PLANS BASED ON SUBOPTIMALITY (75) Inventors: Volker G. Markl, San Jose, CA (US); Vijayshankar Raman, San Jose, CA (US)

(73) Assignee: International Businesss Machines Corporation, Armonk, NY (US)

( * ) Notice: Subject to any disclaimer, the term of this patent is extended or adjusted under 35 U.S.C. 154(b) by 1131 days.

(21) Appl. No.: 12/028,120

(22) Filed: Feb. 8, 2008

(65) Prior Publication Data
US 2008/0215531 A1    Sep. 4, 2008

Related U.S. Application Data (63) Continuation of application No. 10/855,609, filed on May 28, 2004, now Pat. No. 7,353,219.

(51) Int. Cl.
G06F 7/00    (2006.01)

(52) U.S. Cl.
USPC ......................................................... 707/718

(58) Field of Classification Search
USPC ............ 707/999.003, 718, 999.101, 999.102
See application file for complete search history.

(56) References Cited

U.S. PATENT DOCUMENTS

| 5,761,653 | A | 6/1998 | Schiefer et al. .................... 707/2 |
| 5,822,747 | A | 10/1998 | Graefe et al. ...................... 707/2 |
| 5,926,820 | A | 7/1999 | Agrawal et al. ................ 707/200 |
| 6,092,062 | A | 7/2000 | Lohman et al. .................... 707/2 |
| 6,122,627 | A * | 9/2000 | Carey et al. .................... 707/694 |
| 6,272,487 | B1 | 8/2001 | Beavin et al. ...................... 707/2 |
| 6,363,371 | B1 | 3/2002 | Chaudhuri et al. ............... 707/2 |
| 6,510,422 | B1 | 1/2003 | Galindo-Legaria et al. ...... 707/2 |
| 6,625,593 | B1 | 9/2003 | Leung et al. ...................... 707/2 |

(Continued)

OTHER PUBLICATIONS

Zhang et al.; "Dynamic Selection of Optimal Grouping Sequence at Runtime for Grouping Sets, Rollup and Cube Operations in SQL Query Processing;" Jul. 29, 2003.

(Continued)

Primary Examiner — Hosain Alam
Assistant Examiner — Eliyah S Harper
(74) Attorney, Agent, or Firm — IP Authority, LLC; Ramraj Soundararajan (57) ABSTRACT A method for approximating a validity range for a domain of cardinalities of input to an optimal query plan is provided. Such a validity range is iteratively approximated using a modified Newton-Raphson method to find roots of cost functions for optimal and alternative query plans, respectively. The Newton-Raphson method is combined with a method of incrementing roots of cost functions, known as input cardinalities, such that discontinuous and non-differentiable points in cost functions are avoided. In this manner, input cardinalities remain within a domain for which a valid range can be specified. Additionally, a robustness measure is determined by a sensitivity analysis performed on an approximated validity range. Using a robustness measure provided by a sensitivity analysis and resultant validity range and, query plan sub-optimality detection is simplified, re-optimization is selectively triggered, and robustness information is provided to a system or user performing corrective actions.

4 Claims, 9 Drawing Sheets

(56) References Cited

U.S. PATENT DOCUMENTS

| | | | |
|---|---|---|---|
| 6,775,681 B1 * | 8/2004 | Ballamkonda et al. | 707/718 |
| 7,111,025 B2 * | 9/2006 | Finlay et al. | 707/714 |
| 7,139,749 B2 * | 11/2006 | Bossman et al. | 707/714 |
| 7,185,000 B1 * | 2/2007 | Brown et al. | 707/718 |
| 7,194,451 B2 * | 3/2007 | Chaudhuri et al. | 707/694 |
| 7,877,372 B1 * | 1/2011 | Lopes et al. | 707/713 |
| 7,890,491 B1 * | 2/2011 | Simmen | 707/713 |
| 8,290,935 B1 * | 10/2012 | Lopes et al. | 707/718 |
| 2002/0198867 A1 | 12/2002 | Lohman et al. | 707/3 |
| 2003/0055813 A1 | 3/2003 | Chaudhuri et al. | 707/3 |
| 2003/0061244 A1 * | 3/2003 | Hirohata | 707/200 |
| 2003/0167258 A1 | 9/2003 | Koo et al. | 707/2 |
| 2003/0172059 A1 * | 9/2003 | Andrei | 707/3 |
| 2003/0187831 A1 | 10/2003 | Bestgen et al. | 707/3 |
| 2004/0010488 A1 * | 1/2004 | Chaudhuri et al. | 707/3 |
| 2004/0181521 A1 * | 9/2004 | Simmen | 707/3 |

OTHER PUBLICATIONS

Bruno et al.; "Exploiting Statistics on Query Expression for Optimization;" *ACM SIGMOD 2002*; Jun. 4-6, 2002; pp. 263-274.

Chirkova et al.; "A Formal Perspective on the View Selection Problem" *Proceedings of the 27th VLDB Conference*; 2001.

Rjaibi et al.; "Incremental Cardinality Estimation for a Set of Data Values;" Jul. 15, 2002.

Markl et al.; "Learning Table Access Cardinalities with LEO;" *SIGMOD '02*; Jun. 3-6, 2002; p. 613.

Sitllger et al.; "LEO—DB2's LEarning Optimizer;" *Proceedings of the 27th VLDB Conference*; 2001.

Zuzarte, Calisto; "Method of Cardinality Estimation Using Statistical Soft Constraints;" Oct. 18, 2001.

\* cited by examiner

DETERMINING VALIDITY RANGES OF QUERY PLANS BASED ON SUBOPTIMALITY

RELATED APPLICATIONS

This application is a continuation of U.S. application Ser. No. 10/855,609, filed May 28, 2004, pending.

RELATED APPLICATIONS

This application is related to the application entitled "System, Method, and Computer Program Product for Progressive Query Processing", now U.S. Ser. No. 10/698,828, which is hereby incorporated by reference in its entirety, including any appendices and references thereto.

BACKGROUND OF THE INVENTION

1. Field of Invention

The present invention relates generally to the field of query execution strategy optimization. More specifically, the present invention is related to the robustness of query execution strategies based on validity ranges of query cardinality estimates.

2. Discussion of Prior Art

Database Management Systems (DBMSs) traditionally execute queries against a relational database by optimizing to find the best query execution strategy, commonly known as a query plan. A DBMS uses an optimization model to select a query plan that is expected to have the lowest execution cost (e.g., execute the query in the shortest amount of time). Execution cost is largely dependent upon the number of rows that will be processed by each operator in a query plan, also known as row cardinality. Thus, an optimization model estimates cardinality incrementally, typically beginning with statistics of database characteristics collected prior to the optimization process. These statistics may include the number of rows in each table, histograms for each column as proposed in "Propagation of Errors in the Size of Join Results" by Toannidis and Christodoulakis, "Improved Histograms for Selectivity Estimation of Range Predicates" by Poosala et al., and "Selectivity Estimation without Value Independence" by Poosala and Toannidis, as well as sampled synopses as proposed in "Sampling-Based Selectivity Estimation for Joins—Using Augmented Frequent Value Statistics" by Haas and Swami. However, a DBMS optimization cost model is prone to error and inaccuracies. Thus, a plan chosen as being optimal by a DBMS may actually perform worse than expected. Virtually every commercial query optimizer chooses the best query plan using an optimization cost model that is dependant on accurate cardinality estimation.

While query optimizers do a decent job of estimating the cardinality of rows passing through operators in a query plan, there are assumptions underlying the mathematical models upon which these cardinality estimations are based. The currency of database statistics, parameter markers, and the independence of predicates and attributes are among such assumptions. Outdated statistics and subsequent invalid assumptions may cause significant cardinality estimation errors, which may in turn cause significant errors in the estimation of the execution cost of a query plan. The propagation of such errors from erroneous assumptions can cause suboptimal query plans to be chosen during optimization. Thus, current cardinality estimation approaches are limited in that they do not address nor provide for unpredictability in query optimization, specifically, the chance that a chosen query plan is significantly less optimal than an optimal query plan, given erroneous cardinality estimates.

Current parametric optimization approaches attempt to address issues concerning unpredictability and problem by dividing value domains specified for each parameter into intervals, and computing another, separate query plan for each combination of these intervals such that the query plan for a particular interval remains optimal for all parameter values within each intervals. Such an approach is described in "Parametric Query Optimization" by Toannidis et al.

However, parametric optimization approaches are limited in that they require the generation of not one query plan but instead, the enumeration of a whole range of query plans that may or may not be optimal under a given combination of parametric settings. Such an approach is not only expensive in terms of implementation, but also in terms of the memory space and processing time required. The cost for parametric optimization grows exponentially with the size of an original query because the number of query plans that need to be generated, stored, loaded, and processed increases exponentially during runtime. Specifically, "Design and Analysis of Parametric Query Optimization Algorithms" by Ganguly and "Parametric Query Optimization for Linear and Piecewise Linear Cost Functions" by Hulgeri and Sudarshan present algorithms to compute all optimal, parametric query plans for linear and piecewise linear cost functions. The algorithms described by Ganguly as well as by Hulgeri and Sudarshan are prohibitively expensive in that computation time and computation space involved increase exponentially with increases in the number of query parameters. These approaches are limited by their basic exponential nature. Moreover, linear cost assumptions are not able to precisely approximate nuanced cost models used in commercial database systems. Cost models are not always smooth, may not have monotonic input cardinalities, and may have discontinuities.

Prior art described in "Dynamic Query Evaluation plans" by Graefe and Ward and "Optimization of Dynamic query evaluation plans", by Cole and Graefe implements an alternative form of parametric query optimization in the Volcano™ optimizer generator. The main premise of these approaches lies in the introduction of a choose-plan operator to "glue" together multiple alternative query plans. At compile time, if uncertainty exists for any parameter value in a cost function, query plans involving these cost functions are declared as being incomparable. At execution start-up time, actual parameter values are applied to cost functions and all incomparable query plans are re-costed. In this manner, a single, optimal query plan is chosen. The described approach is limited in that there is no premise for how to choose parameters to be marked as being uncertain. If all parameters in a query plan are marked as uncertain, an exponential number of query plans will be generated.

An approach reducing the impact of cardinality estimates by Kabra and Dewitt in "Efficient Mid-Query Re-Optimization of Sub-Optimal Query Execution Plans" describes the use of an ad hoc cardinality error threshold for determining whether to re-optimize a query plan. This approach is limited in that an ad hoc validity threshold is an overestimate for some query plans and an underestimate for others.

U.S. Pat. No. 6,363,371 discloses a method for identifying essential statistics for query optimization in database systems. However, the disclosed method does not determine validity ranges nor does it determine these essential statistics from intersection points of cost functions to obtain the sensitivity of the best plan to cardinality estimates.

The LEO project proposed by Stillger et al. in "LEO—DB2™'s Learning Optimizer" addresses the problem of using query feedback to optimize future queries based on cardinality estimation errors observed during previous query executions. The DEC RDB™ system executes multiple access methods and performs a competitive comparison before selecting one. Neither of these two approaches addresses a robustness measure for a currently running query, namely, the probability that a current query plan will perform sub-optimally given inaccurate cardinality estimates.

Whatever the precise merits, features, and advantages of the above cited references, none of them achieves or fulfills the purposes of the present invention.

SUMMARY OF THE INVENTION

The method of the present invention provides for the determination of the robustness of a query plan by computing thresholds for each operator in the query plan. These thresholds, known as validity ranges, are specified by an upper and lower bound on the number of records, also known as row cardinality, passing through a given operator for which a given query plan will continue to remain optimal. For example, if a validity range for an operator in a query plan has a lower bound of one hundred and an upper bound of five thousand, then if either less than a hundred records or more than five thousand records pass through this query operator during execution, it is guaranteed that another query plan will perform better than the current query plan.

In computing a validity range, a guarantee of optimality is provided for a chosen query plan as long as input cardinalities estimates remain within these limits. Otherwise, if a cardinality estimate exceeds limits defined by a validity range, the chosen query plan is guaranteed to be sub-optimal with respect to another, alternative query plan. This present invention focuses on a single query plan chosen by a query optimizer and the computation of a validity range for each edge of said single query plan. Validity ranges are computed by performing a query plan sensitivity analysis during the process of query optimization.

During query optimization, a DBMS considers query plan alternatives for each query operator, and prunes query plans that are dominated, with respect to cost, by other query plans at given cardinality estimated by a query optimizer. Subsequently, a validity range is iteratively computed by treating costs of dominant and dominated query plans as multi-variate functions of cardinalities of inputs to a given operator. An intersection point and subsequent region of cost inversion for both multi-variate cost functions is incrementally approached by solving for a root of the difference of the two multi-variate cost functions. With each iteration, if a determined root is less than a current upper bound, the bound is accordingly decreased. Likewise, if a determined root is greater than a current lower bound, the bound is accordingly increased. Intersection points represent an upper and lower bound on the cardinality of input within which a dominant query plan remains dominant and a dominated query plan remains dominated and outside of which a dominant and dominating query plans are reversed, (i.e. the dominated plan becomes the dominating plan). An iterative, incremental validity range computation is repeated during query optimization each time an alternative query plan is pruned with respect to a current query plan.

To solve for roots of the difference of chosen and alternative query plan cost functions, the Newton-Raphson method is utilized in conjunction with a method for avoiding discontinuities and non-differentiable points present in such cost functions. In this manner, suboptimal performance with respect to a currently running and those structurally equivalent query plans is detected, wherein structural equivalence encompasses query plans with alternative choices for physical operators, as well as query plans with different operand commutation for each plan operator. In other embodiments, the method of the present invention is extended to other estimation errors, for example, estimation errors in memory allocation.

By focusing on only a single query plan chosen by a query optimizer, the present invention avoids enumerating an exponential number of query plans accounting for possible combination of valid parameter values. Additionally, the need for precisely approximated linear cost assumptions is obviated by the computation of an individual validity range for each individual input edge of the chosen query plan. Limitations of re-costing query plans during execution start-up are overcome by embedding the computation of validity ranges into an initial, query optimizer pruning phase. Introducing ranges of valid row cardinalities for each individual operator on a per-query basis obviates the necessity of choosing operators for which parameter values are uncertain. The present invention additionally overcomes the unsuitability of ad hoc validity thresholds to certain query plans by performing computations during a query optimization phase. Statistically calculating a threshold from empirical data produces uncertainties and thus, produces a threshold that is suitable to only a majority of query plans. By contrast, the present invention calculates a validity range for input cardinality estimates, such that a given query plan is, with certainty, always optimal for input cardinalities within the calculated range, and is always sub-optimal, with certainty, for input cardinalities outside the calculated range. A robustness measure is also provided for a chosen query plan based on an analysis of the chosen query plan's sensitivity to inaccurate cardinality estimates. Thus, a provision is made to calculate the probability that a currently running query plan will perform sub-optimally.

One application of the present invention is in conjunction with a technique called Progressive Query Optimization (POP). For a detailed discussion of POP, please refer to Ser. No. 10/698,828. POP provides a contingency plan for a query by lazily triggering re-optimization in the midst of query execution, should cardinality estimation errors indicate that a chosen query plan is less than optimal. To do this, one or more checkpoint operators continually tracks the actual number of rows passing through. If actual row cardinality is significantly different from estimated cardinality, POP triggers re-optimization. The present invention complements POP by providing a precise threshold for the extent of the cardinality error at which re-optimization is triggered, using the validity ranges of the query operators. The computation of validity ranges enhances the robustness of the POP model because they ensure that POP will trigger re-optimization only if a current plan is definitely sub-optimal and there is definitely another query plan that will perform better than the current query plan.

Another application of validity ranges lies in an overall measure of the robustness of the query plan, which can help the database administrator decide whether a given query plan is too volatile to be used in a certain environment. This is more powerful than a current optimization model in which a DBMS chooses a least-cost query plan irrespective of its risk with respect to certain environments. For example, if validity ranges for a first query plan are relatively narrow and validity ranges for a second query plan are wider in comparison, a database administrator optimizes robustness by choosing the second query plan even if costs slightly more than the first query plan, simply because its performance is more predictable.

DESCRIPTION OF THE PREFERRED EMBODIMENTS

While this invention is illustrated and described in a preferred embodiment, the invention may be produced in many different configurations. There is depicted in the drawings, and will herein be described in detail, a preferred embodiment of the invention, with the understanding that the present disclosure is to be considered as an exemplification of the principles of the invention and the associated functional specifications for its construction and is not intended to limit the invention to the embodiment illustrated. Those skilled in the art will envision many other possible variations within the scope of the present invention.

In executing a query against a relational database, a query plan is formulated comprising a graph of query plan operators connected by directed edges. During query execution, each edge d provides a set of rows to an operator o in a given query plan. The cardinality of the set of rows provided by d is dependent on predicates and operands upon which o operates. Operations are performed on relational data by each operator of a given query plan. Based on the operation performed, the cardinality of a row set either increases or decreases. Optimality of a query plan with respect to other, structurally equivalent plans is maintained as long as the cardinality of a row set provided as input and flowing through each operator in an optimal plan remains within a certain range. Thus, a validity range for d is defined by an upper and lower bound on the cardinality of rows flowing through an operator o, such that if the cardinality of rows flowing through o falls outside these bounds, plan P becomes sub-optimal. That is, at least one structurally equivalent query plan exists which is cheaper than the current plan P.

Validity ranges are computed during query optimization using plan sensitivity analysis. For each edge input to an operator in a query plan, a validity range is determined and is iteratively narrowed to a specified sensitivity. The narrower the validity range, the more sensitive a plan is to a change in the cardinality of a row set associated with an edge.

During query optimization, a DBMS considers alternative query plans for each query operator, and prunes query plans that are dominated by other query plans. The validity range for a given query operator is updated during this process by solving for intersection points between a cost function for an optimal plan with an operator ($P_{opt}$) and a cost function for an alternative plan with an operator ($P_{alt}$). The intersection point is computed by solving for the root of the difference of the two cost functions, $P_{opt}$ and $P_{alt}$. When an operator has multiple input edges, for example, a query joining more than one relational table, the roots are found by treating both cost functions as multivariate functions of the edge cardinalities. This process is repeated for each alternative plan that is pruned with respect to $P_{opt}$. During each iteration, if a determined root is less than a current upper bound, the bound is accordingly decreased. Likewise, if a determined root is greater than a current lower bound, the bound is accordingly increased. Intersection points represent an upper and lower bound on the cardinality of input within which a dominant query plan remains dominant and a dominated query plan remains dominated and outside of which dominant and dominating query plans are reversed, (i.e. the dominated plan becomes the dominating plan). An iterative, incremental validity range computation, utilizing the Newton-Raphson method in combination with a method providing for discontinuities and non-differentiable points present in cost functions, is repeated during query optimization each time an alternative query is pruned with respect to a current query plan.

Structurally equivalent query plans having identical properties are often detected by common input edges. Such properties are comprised of joined tables, predicates, projected columns, and sort order. However, it is not necessary for structurally equivalent query plans having identical properties to have the same physical operators (e.g., join algorithms) between operands, nor is it necessary to have the same order of operands between operators. For example, the order of inner and outer edges for an operator may be reversed between two plans, but still remain structurally equivalent. Accommodating for variations in physical operators and operand commutations, a pair of query plans is defined as being structurally equivalent if they share a common set of edges, irrespective of sequence. A set of edges for a query plan is comprised of the records flowing through each operator in the query plan. Validity range computations ensure that throughout each validity range there is exactly one optimal query plan among structurally equivalent query plans.

In an initial phase, a query optimizer enumerates possible query plans for the execution of a query against a relational database and compares the cost of executing each enumerated query plan. Comparison is made between the costs of an optimal query plan $P_{opt}$ with root operator $o_{opt}$ and another, alternative query plan $P_{alt}$ having the same properties and a different root operator, $o_{alt}$. The costs of query plans $P_{opt}$ and $P_{alt}$ are functions of edge cardinalities provided as input to each respective root operator, $o_{opt}$ and $o_{alt}$. Optimal query plan $P_{opt}$ is selected such that it dominates, and $P_{alt}$ is pruned due to its higher cost.

The cardinality of rows provided as input to a root operator by edge d, is first estimated as e. For an edge having an estimated cardinality e, query plan $P_{opt}$ has a comparatively lower cost than query plan $P_{alt}$. A validity range for operator $o_{opt}$ is computed, given an estimated cardinality e for input edge d and then iteratively narrowed. As alternative query plan $P_{alt}$ is pruned, it is determined whether there exists an input edge cardinality c, greater than estimation e, such that both $P_{alt}$ and $P_{opt}$ have the same execution cost.

Figure 1:
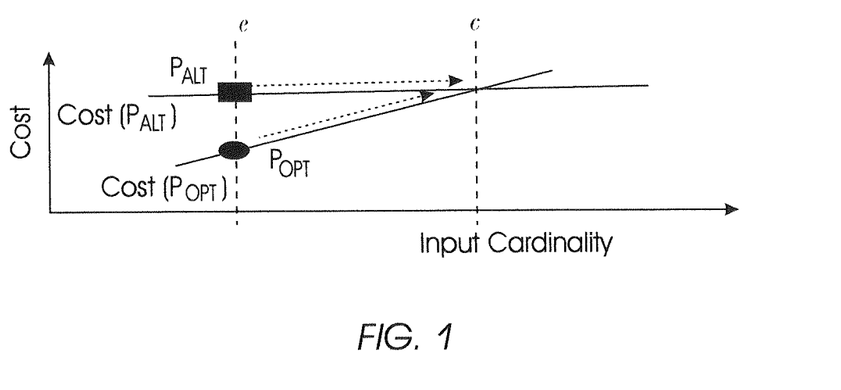
FIG. 1 illustrates the intersection of execution cost functions for optimal and alternative query plans, respectively, as a function of input cardinalities.

Referring now to FIG. 1, execution cost functions for $P_{opt}$ and $P_{alt}$, cost($P_{alt}$, c) and cost($P_{opt}$, c), are shown as intersecting. For an estimated input edge cardinality e, upon which execution cost functions for $P_{opt}$ and $P_{alt}$ depend, $P_{opt}$ is shown to have a lower execution cost than $P_{alt}$ and hence, is more optimal. The intersection point is found by solving for an input edge cardinality c, greater than initial estimate e, for which both $P_{alt}$ and $P_{opt}$ have the same execution cost. Input edge cardinality c is found by solving for the root of Eqn. 1.

$$\text{cost}(P_{alt}, c) - \text{cost}(P_{opt}, c) = 0 \tag{1}$$

A cost inversion occurs when an input edge has a cardinality greater than c, wherein $P_{alt}$ has a lower execution cost than $P_{opt}$. In FIG. 1, this cost inversion occurs to the right of intersection point, c. When an operator has multiple input edges (e.g., join operators between relational tables), roots are obtained by treating cost functions for optimal and alternative query plans as multivariate functions of input edge cardinalities. For each alternative query plan pruned with respect to $P_{opt}$, an intersection point is obtained via a solution or solutions to equated cost functions. During each iteration leading to the discovery of an intersection point, it is determined whether solved for root c of Eqn. 1 is less than a current upper bound for a validity range. If such is the case, a validity range is narrowed accordingly.

Figure 2:
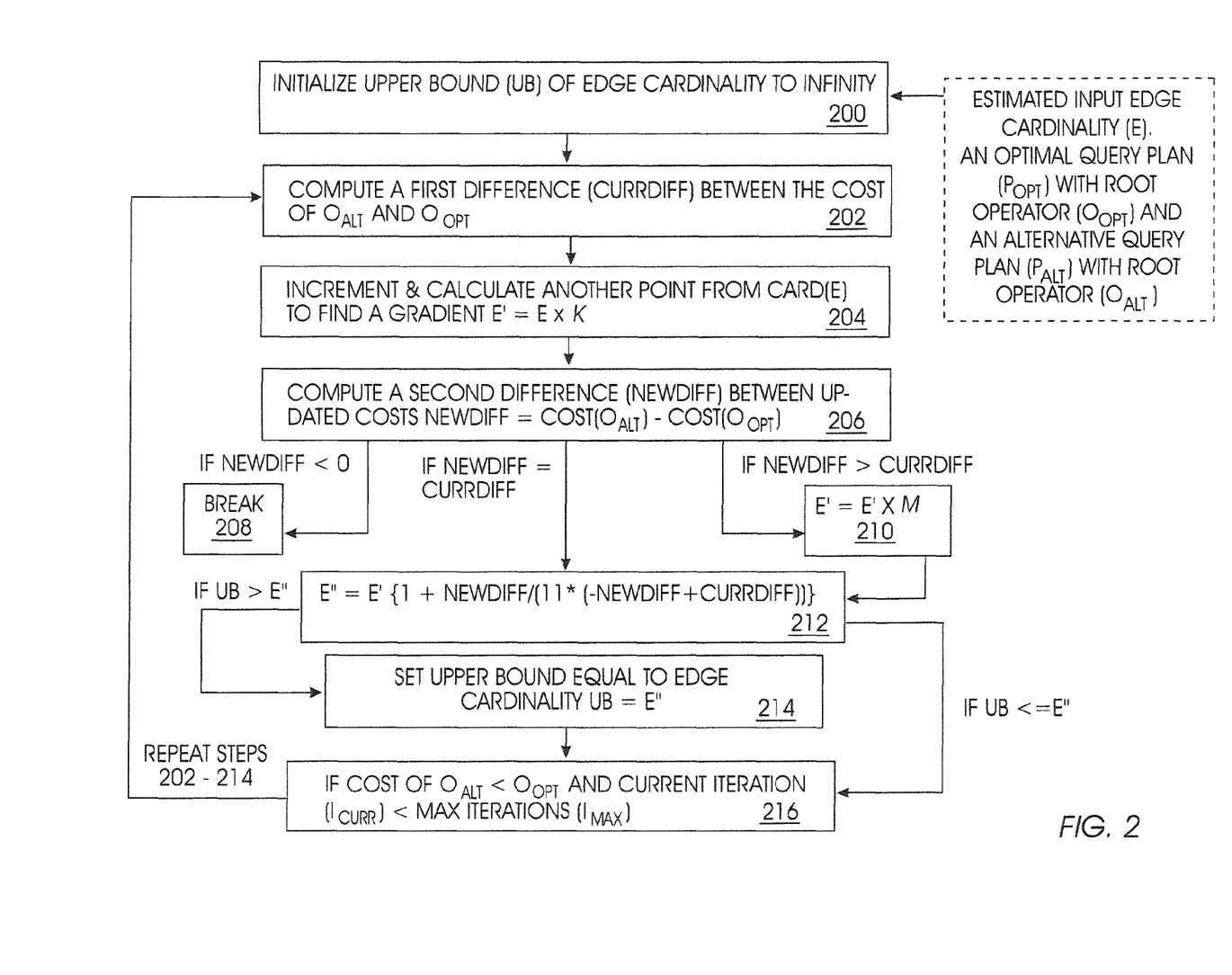
FIG. 2 is a validity range approximation process flow diagram of the present invention.

Shown in FIG. 2 is a validity range approximation process flow incorporating a Newton-Raphson method modified to account for discontinuities in cost functions. Input edge cardinalities are iteratively increased and validity ranges for an operator are iteratively narrowed until a cost inversion between an optimal and alternative plan is reached. In another embodiment, the iterative narrowing of a validity range approximation is terminated prior to reaching intersection point at input edge cardinality c. In this manner, a validity range is conservatively approximated.

Referring now to step 200, provided as input are an estimated input edge cardinality e, and an optimal query plan $P_{opt}$ with root operator $o_{opt}$ pruning an alternative query plan $P_{alt}$ with root operator $o_{alt}$. An upper bound $U_B$ for a validity range is approximated for estimated input edge cardinality, e, is initialized to infinity in step 200. While the execution cost of $P_{opt}$ with root operator $o_{opt}$ is less than that of an alternative query plan $P_{alt}$ with root operator $o_{alt}$, and the number of times the algorithm has iterated, $i_{curr}$, is less than a maximum number of iterations, $i_{max}$, specified by a system or user, steps 202 through 214 are repeated. Note that an execution cost for $o_{opt}$ is compared with an execution cost for $o_{alt}$ since these root operators embody the only difference between $P_{opt}$ and $P_{alt}$. In step 202, a current difference, currDiff, in execution cost between $P_{opt}$ and $P_{alt}$ is calculated. In step 204, estimated input edge cardinality e is multiplied by a specified constant, k, resulting in an incremented input edge cardinality e' that is used to find a gradient (i.e., linear slope function) between input edge cardinalities in subsequent iterations. Following, in step 206, a new difference, newDiff, between execution costs of $P_{opt}$ and $P_{alt}$ is calculated using e'. If it is determined that newDiff is less than zero, then a convergence has been surpassed and a cost inversion has occurred; the algorithms breaks in step 208 and returns the last value stored by the algorithm, as an approximated upper bound $U_b$. Otherwise, if newDiff is greater than CurrDiff, execution cost functions of $P_{opt}$ and $P_{alt}$, calculated by Newton-Raphson are diverging. To jump over and escape discontinuities, e' is multiplied by a specified, relatively large constant, m, in step 210. In this manner, a discontinuity is quickly bypassed without requiring iterations to incrementally approach an area in which $P_{opt}$ and $P_{alt}$ are diverging. Step 212 follows step 206 if newDiff is equal to currDiff and step 210 proceeds to step 212 if newDiff is greater than currDiff, wherein incremented cardinality, e', is input to an approximated linear slope function $$e''=e'*\{1+[newDiff/(11*(-newDiff+currDiff))]\} \quad (2)$$

thus yielding a corresponding dependent y-value, e", from incremented edge cardinality, e', and from the slope of a line defined by newDiff and currDiff in Eqn (2). Subsequently, in step 214, $U_b$ is narrowed in proportion to e", an execution cost calculated for a current cardinality, e'. Following in step 216, it is checked to see whether execution cost for $P_{opt}$ is less than that of $P_{alt}$ and as if the current iteration, $i_{curr}$, is less than a maximum number of iterations, $i_{max}$, specified by a system or a user. The validity range approximation algorithm of the present invention approximates a validity range for each member edge in a set comprised of edges seen by operators in a query plan.

Figure 3A:
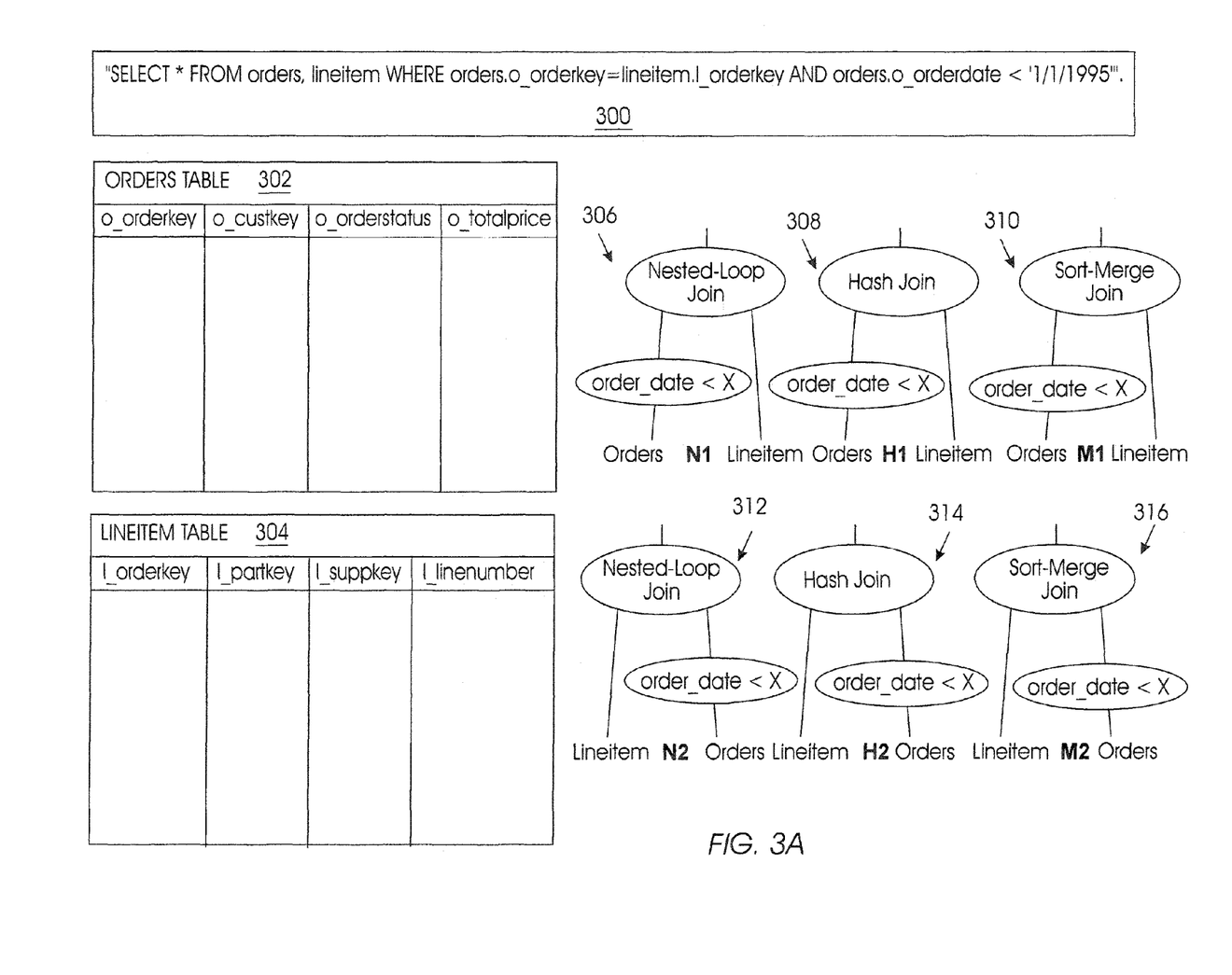
FIGS. 3a-g, collectively, illustrate an exemplary validity range approximation.

Shown in FIGS. 3a-f, collectively, is an exemplary approximation of a validity range when an optimal query plan prunes another. A query optimizer enumerates query plans for the execution of SQL query 300 against a database, in specific, orders table 302 and lineitem table 304 as shown in FIG. 3a. Structurally equivalent query plans 306-314 enumerated by a query optimizer have the same operands, but are unique in their innermost operator and ordering of operands. Three different types of join operators (e.g., nested-loop, hash, and sort-merge) combined with two different operand orderings of orders table 302 and lineitem table 304 produce six possible query plans, N1, H1, M1, N2, H2, and M2.

Figure 3B:
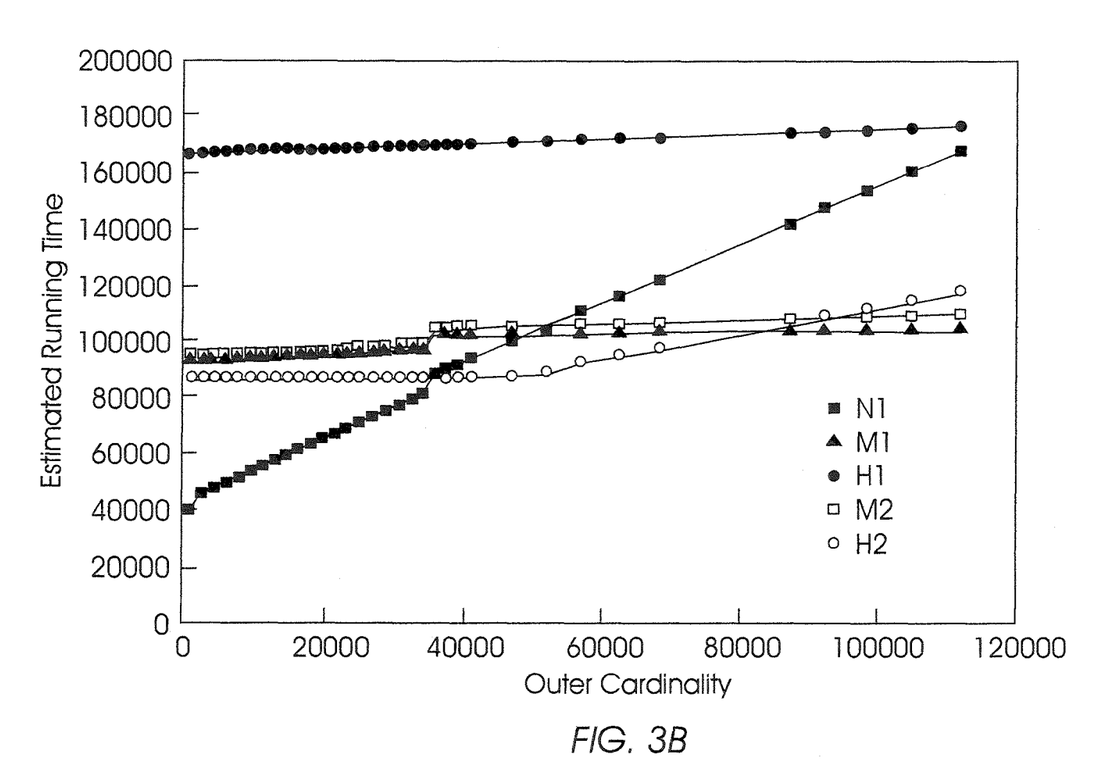

Referring now to FIG. 3b, estimated costs, in terms of running time in the exemplary figure, are shown for five enumerated structurally equivalent query plans 306-312 as functions of outer cardinality values. Query plan 314 is excluded because its cost is too expensive to be shown in the figure. Changes in outer cardinality values are effected by varying the selectivity of a predicate in SQL query 300. In specific, the selectivity of the predicate, orders.o_orderdate<x, is varied by varying date value of x. Given an estimated cardinality of approximately 20,000, a query optimizer chooses optimal query plan N1 306 that is least-cost for the estimated cardinality. Subsequently, chosen query plan N1 306 is pruned with respect to structurally equivalent query plans H1 308, M1 310, N2 312, and H2 314.

Figure 3C:
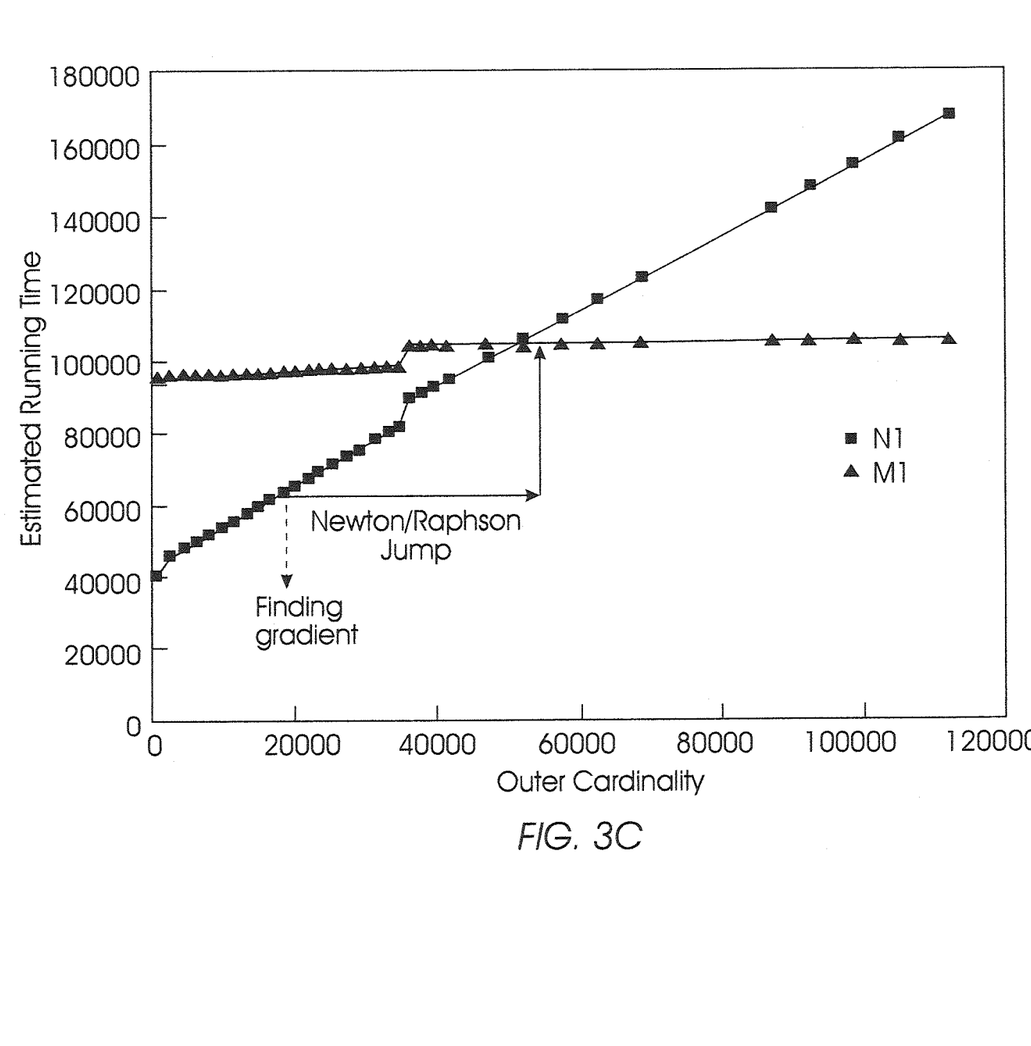

Shown in FIG. 3c is optimal query plan N1 306 pruned with respect to alternative query plan M1 310. The intersection point between query plans N1 306 and M1 310 is iteratively approached from the left where query plan N1 306 dominates query plan M1 310, starting from an initial cardinality value estimated for query plan N1 306 by a query optimizer. In the exemplary figure, initial cardinality value estimated for query plan N1 306 is approximately twenty thousand. Approaching an intersection point approaches a point beyond which a cost inversion occurs, wherein query plan M1 310 dominates query plan N1 306. With the passing of each iteration, an approximation of the intersection point is refined. In FIG. 3c an upper bound is approximated by a single iteration of the Newton-Raphson method.

Figure 3D:
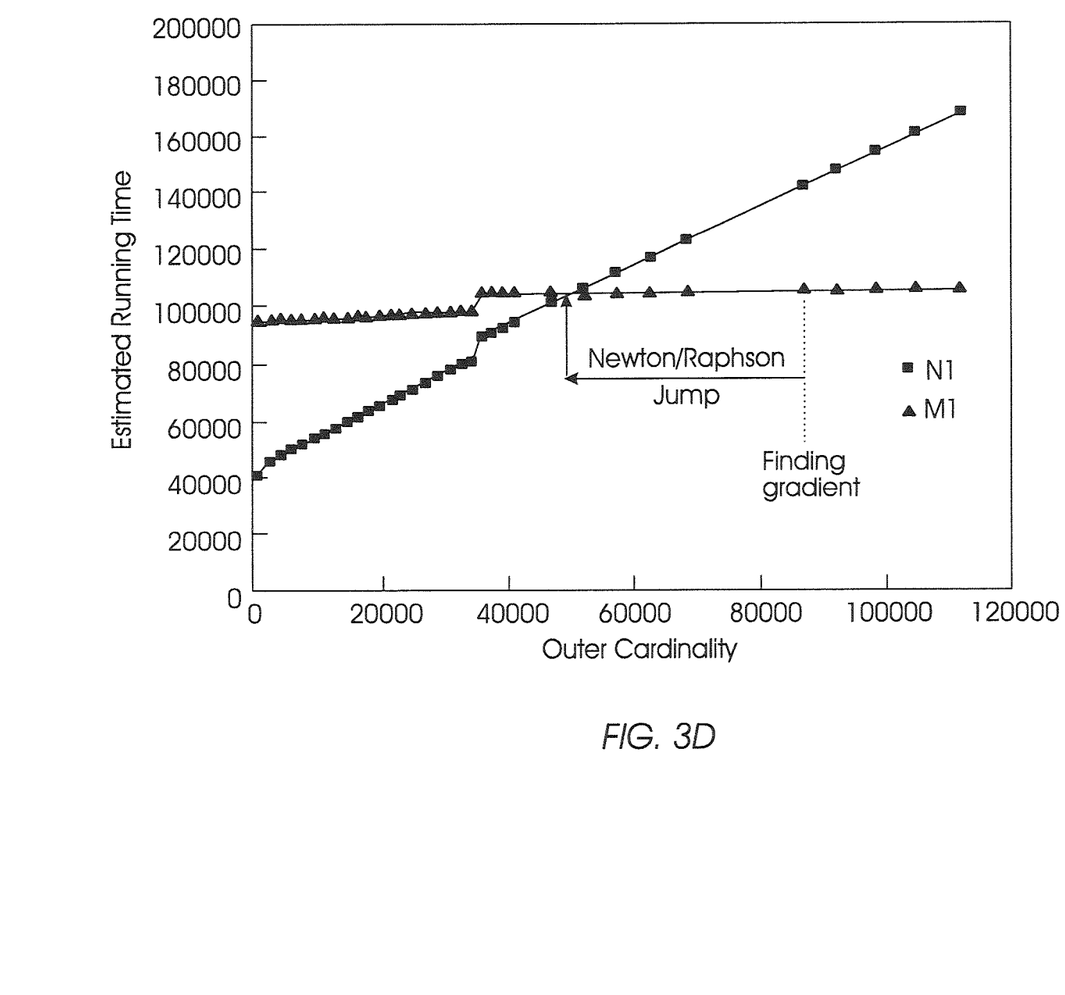

Referring now to FIG. 3d, the intersection point between query plans N1 306 and M1 310 is iteratively approached from the right, wherein query plan M1 310 dominates query plan N1 306. Approaching the intersection point approaches a point beyond which a cost inversion occurs and query plan N1 306 dominates query plan M1 310. Starting at an outer cardinality value estimated by a query optimizer for query plan M1 310 when query plan M1 310 is optimal with respect to all other enumerated plans 306, 308, 312, and 314, the intersection point is approached in the same manner. A lower bound is approximated by a single iteration of the Newton-Raphson method.

Figure 3E:
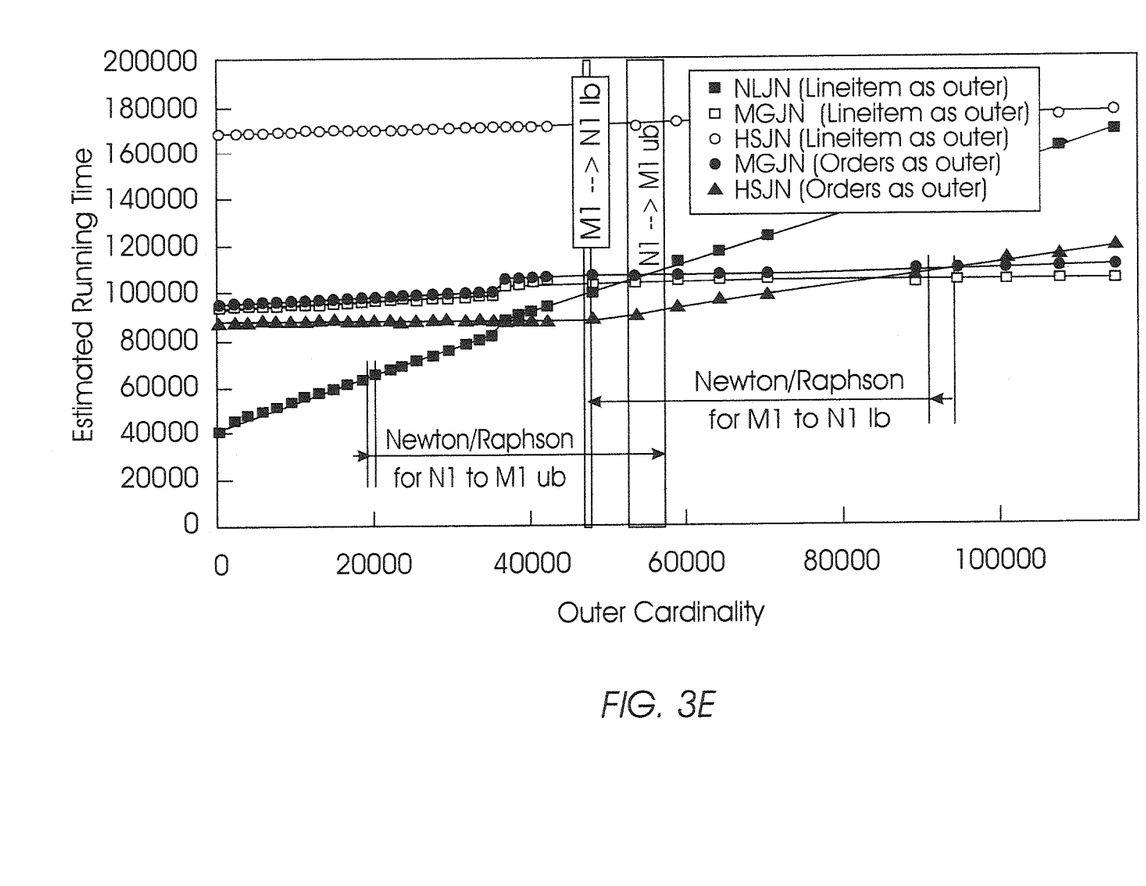

In FIG. 3e, a shaded area representing an upper bound region and a lower bound region of a validity range approximated for query plan N1 306 when pruned with respect to query plan M1 310. The region corresponds to bounds computed as a result of utilizing a full range of initial outer cardinalities estimated by a query optimizer. An upper bound region of a validity range remaining relatively narrow regardless of inaccurate cardinality estimations given by a query optimizer illustrates the stability of the algorithm of the present invention. Also shown is a corresponding lower bound region for a validity range approximated for query plan N1 306 when pruned with respect M1 310. The distance (e.g., outer cardinality values) separating an upper bound region and a lower bound region in a validity range approximation is proportional the stability of the query plan in the face of inaccurate cardinality estimations given by a query optimizer.

Figure 3F:
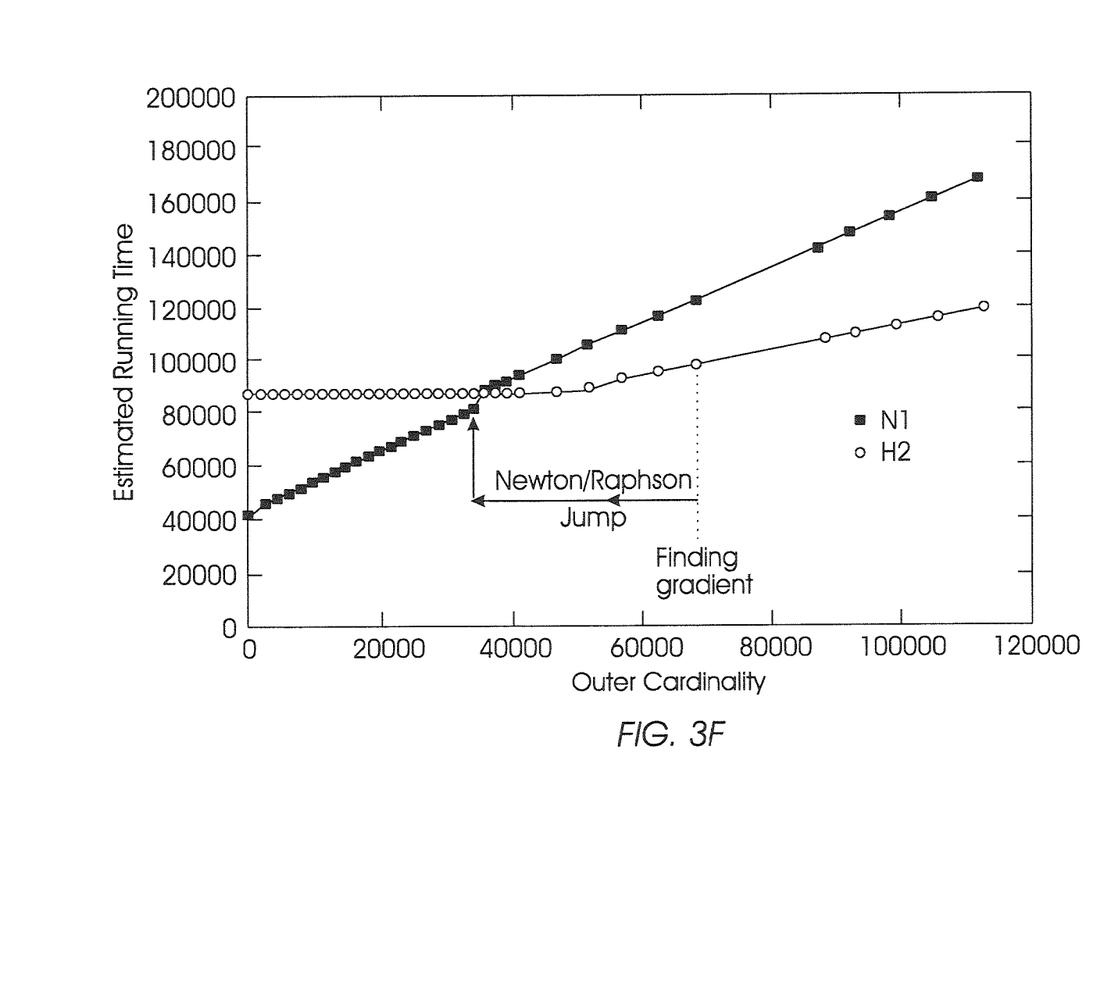

The method of the present invention is repeated, pruning each other alternative query plan H1 308, N2 312, and H2 314 with respect to query plan N1 306. With each repetition, bounds are adjusted to narrow the validity range approximation, as necessary. Of particular interest is the repetition in which query plan N1 306 is pruned with respect to alternative query plan H2 314. Referring now to FIG. 3f, a cost inversion between query plan N1 306 and query plan H2 314 is shown as occurring first, at a lower outer cardinality value than cost inversions between query plan N1 306 and alternative query plans H1 308, M1 310, and N2 312 occur. Thus, a validity range approximation for query plan N1 306 is narrowed by an upper bound adjustment when pruned with respect to query plan H2 314.

Figure 3G:
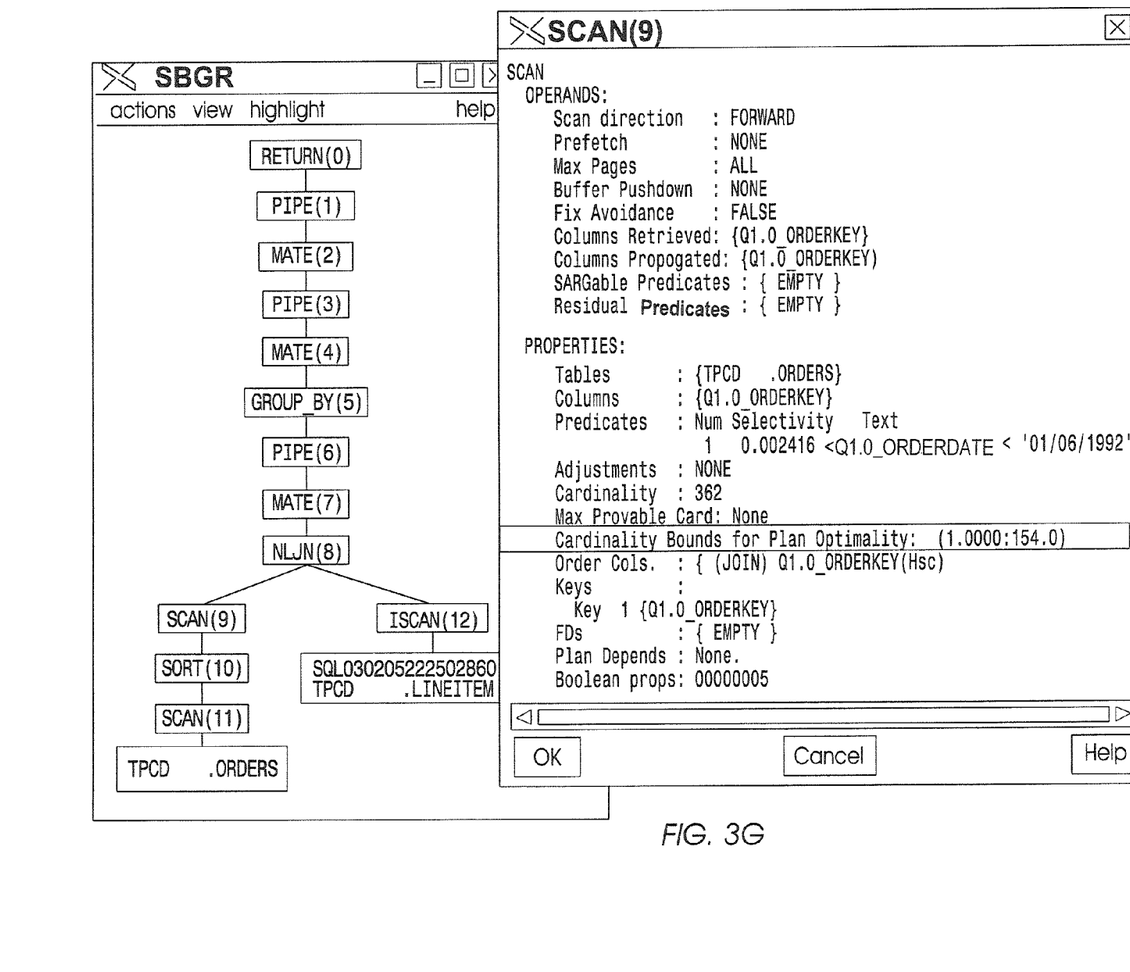

Shown in FIG. 3g is a screenshot of a graphical user interface (GUI) associated with the present invention.

From a sensitivity analysis of a query plan and resultant validity range, a query optimizer is enabled to determine during either compilation or run-time, whether a query plan is sub-optimal. Thus, re-optimization is triggered with the certainty that there exists a more optimal plan than a current plan. In conjunction with sensitivity analysis and a resultant validity range, a robustness measure is determined for and displayed with query operators in a query plan. A robustness measure for a query operator, and hence, a query plan, is proportional to the size of a corresponding validity range. A larger validity range for a query operator or plan indicates a proportionally larger margin of allowable error in cardinality estimation, before a query plan is deemed sub-optimal.

In the event of re-optimization, an option to choose between a least-cost (i.e. fastest) query plan and a robust query plan exists. Rather than simply selecting a query plan having the fastest execution time each time re-optimization occurs, a robustness measure enables the choice of a query plan having an execution time that is more robust and stable in the event that a query optimizer's model of data distribution turns out to be inaccurate. If a query plan having a faster execution time and smaller robustness measure, $q_1$, is chosen over a query plan with a slower execution time and larger robustness measure, $q_2$, the probability that $q_1$ becomes sub-optimal is relatively greater than that of $q_2$. This is because the chance that an estimation of cardinality will lay outside a smaller validity range is higher than the chance that a cardinality estimation determined by a common data distribution model will lie outside a larger validity range.

Additionally, the present invention provides for an article of manufacture comprising computer readable program code contained within implementing one or more modules to iteratively approximate a validity range of estimated edge input cardinalities within which a given query plan remains optimal. Furthermore, the present invention includes a computer program code-based product, which is a storage medium having program code stored therein which can be used to instruct a computer to perform any of the methods associated with the present invention. The computer storage medium includes any of, but is not limited to, the following: CD-ROM, DVD, magnetic tape, optical disc, hard drive, floppy disk, ferroelectric memory, flash memory, ferromagnetic memory, optical storage, charge coupled devices, magnetic or optical cards, smart cards, EEPROM, EPROM, RAM, ROM, DRAM, SRAM, SDRAM, or any other appropriate static or dynamic memory or data storage devices.

Implemented in computer program code based products are software modules for: (a) comparing execution costs of an optimal and alternative query plan given an input edge cardinality; (b) updating an input edge cardinality until a comparison of execution costs results in a cost inversion; and (c) adjusting an upper or lower bound with respect to a most recently updated input edge cardinality.

CONCLUSION

A system and method has been shown in the above embodiments for the effective implementation of validity range determination for query plans based on suboptimality. While various preferred embodiments have been shown and described, it will be understood that there is no intent to limit the invention by such disclosure, but rather, it is intended to cover all modifications falling within the spirit and scope of the invention, as defined in the appended claims. For example, the present invention should not be limited by software/program.

The above enhancements are implemented in various computing environments. For example, the present invention may be implemented on a conventional IBM PC or equivalent. All programming and data related thereto are stored in computer memory, static or dynamic, and may be retrieved by the user in any of: conventional computer storage, display (i.e., CRT), and/or hardcopy (i.e., printed) formats. The programming of the present invention may be implemented by one of skill in the art of database programming and/or query optimization.

The invention claimed is:

1. A method for selecting an optimal query plan for the execution of a database query, said method comprising:
   a. comparing a first query plan chosen by a query optimizer to at least one structurally equivalent query plan, said comparison made with respect to cost as a function of input row, outer cardinality, said first query plan formulated based on a graph of query plan operators connected by directed edges, with each edge d providing a set of rows to an operator o in a given query plan;
   b. developing a robustness measure for each of said first query plan and at least one structurally equivalent query plan, said robustness measured by the probability that each of said first query plan and at least one structurally equivalent query plans is least-cost with respect to cost determined by a database query execution cost model, and said robustness measure for a query operator and a query plan being proportional to a size of a corresponding validity range, with a larger validity range for a query operator or plan indicating a proportionally larger margin of allowable error in cardinality estimation prior to a query plan being deemed sub-optimal, said validity range for each said edge d defined by an upper and lower bound on a cardinality of rows flowing through operator o, such that when said cardinality of rows flowing through operator o falls outside said upper and lower bounds, a given plan becomes sub-optimal;
   c. selectively choosing either of: said first query plan or one of said at least one structurally equivalent query plans, based on a comparison of said developed robustness measures;
   d. executing a database query based on said selected query plan in step c, and wherein said developed robustness measure for said chosen query plan is greater in value than each of said developed robustness measures for each of said first query plan and at least one structurally equivalent query plans not chosen in said choosing step.

2. A method for selecting an optimal query plan, as per claim 1, wherein each of said at least one structurally equivalent query plans share in common, at least: joined tables, predicates, and projected columns, and any of: physical operators between operands, order of operands between operators, and sort order.

3. A method for determining the sensitivity of a first query plan chosen by a database query optimizer to input row cardinality values inaccurately estimated by a database query execution cost model, said first query plan formulated based on a graph of query plan operators connected by directed edges, with each edge d providing a set of rows to an operator o in a given query plan, said method comprising:
   a. comparing said first query plan to at least one structurally equivalent query plan; said comparison made with respect to cost as a function over a range of input row cardinality values;
   b. developing a validity range of said input row cardinalities values for each operator in said first query plan based on results of said comparison such that said first query plan is least-cost within said developed validity range and said first query plan is not least-cost outside of said developed validity range, said validity range for each said edge d defined by an upper and lower bound on a cardinality of rows flowing through operator o, such that when said cardinality of rows flowing through operator o falls outside said upper and lower bounds, a given plan becomes sub-optimal;
   c. outputting said developed validity range, and
      wherein sensitivity of said first query plan is proportional to size of said developed validity range.

4. An article of manufacture comprising non-transitory computer usable medium having computer readable program code embodied therein which selects an optimal query plan for the execution of a database query, said non-transitory medium comprising computer readable program code for:

a. comparing a first query plan chosen by a query optimizer to at least one structurally equivalent query plan, said comparison made with respect to cost as a function of input row, outer cardinality, said first query plan formulated based on a graph of query plan operators connected by directed edges, with each edge d providing a set of rows to an operator o in a given query plan;
   b. developing a robustness measure for each of said first query plan and at least one structurally equivalent query plans, said robustness measured by the probability that each of said first query plan and at least one structurally equivalent query plans is least-cost with respect to cost determined by a database query execution cost model, and said robustness measure for a query operator and a query plan being proportional to a size of a corresponding validity range, with a larger validity range for a query operator or plan indicating a proportionally larger margin of allowable error in cardinality estimation prior to a query plan being deemed sub-optimal, said validity range for each said edge d defined by an upper and lower bound on a cardinality of rows flowing through operator o, such that when said cardinality of rows flowing through operator o falls outside said upper and lower bounds, a given plan becomes sub-optimal;
   c. choosing either of: said first query plan or one of said at least one structurally equivalent query plans, based on a comparison of said developed robustness measures;
   d. executing a database query based on said chosen query plan in step c, and wherein said developed robustness measure for said chosen query plan is greater in value than each of said developed robustness measures for each of said first query plan and at least one structurally equivalent query plans not chosen in said choosing step.

* * * * *